United States Patent [19]

Amrhein et al.

[11] Patent Number: 5,004,015

[45] Date of Patent: Apr. 2, 1991

[54] DIRECTIONAL CONTROL DEVICE

[75] Inventors: Reinhard Amrhein, Frammersbach; Walter Heid, Neustadt; Günther Muschong, Wuerzburg, all of Fed. Rep. of Germany

[73] Assignee: Mannesmann Rexroth GmbH, Fed. Rep. of Germany

[21] Appl. No.: 353,066

[22] Filed: May 17, 1989

Related U.S. Application Data

[60] Division of Ser. No. 73,364, Jul. 10, 1987, Pat. No. 4,832,081, which is a continuation of Ser. No. 800,074, filed as PCT EP85/00074 on Mar. 1, 1985, abandoned.

[30] Foreign Application Priority Data

| Mar. 1, 1984 | [DE] | Fed. Rep. of Germany | 3407653 |
| Mar. 1, 1984 | [DE] | Fed. Rep. of Germany | 8406441[U] |
| Nov. 14, 1984 | [DE] | Fed. Rep. of Germany | 3441650 |
| Nov. 14, 1984 | [DE] | Fed. Rep. of Germany | 8433398[U] |

[51] Int. Cl.$^5$ ............................................. F15B 13/04
[52] U.S. Cl. ................................. 137/625.68; 251/900
[58] Field of Search ................ 137/625.38, 625.26, 137/625.68; 251/900

[56] References Cited

U.S. PATENT DOCUMENTS

| 583,822 | 6/1897 | Shem . |
| 1,385,019 | 7/1921 | Mathieu . |
| 2,469,921 | 5/1949 | Hoge . |
| 2,556,308 | 6/1951 | Weatherhead, Jr. . |
| 2,910,050 | 10/1959 | Dotter et al. . |
| 3,076,476 | 2/1963 | Campbell . |
| 4,096,880 | 6/1978 | Lemmon et al. . |
| 4,458,718 | 7/1984 | Vick . |

FOREIGN PATENT DOCUMENTS

| 2157347 | 7/1972 | Fed. Rep. of Germany . |
| 2808447 | 8/1979 | Fed. Rep. of Germany . |
| 3037674 | 5/1982 | Fed. Rep. of Germany . |

Primary Examiner—Gerald A. Michalsky
Attorney, Agent, or Firm—Cushman, Darby & Cushman

[57] ABSTRACT

The present invention relates to the use of two different sealing means in a directional spool valve. On the one hand side, a pressure guide element is provided at the spool so as to make sure that the pressure medium can only flow in radial direction against a seal located in the housing. The second sealing means may be of different design. It is possible that a spool seat surface provided on the spool and moveable against the force of a spring is used, said spool seat surface being adapted to cooperate with a stationary seat surface provided at the housing; alternatively a plurality of control bores is provided in the housing in the area of a port, said bores having a relatively small diameter d, and wherein a seal located the spool is used for opening and closing said bores so that no damage of the seal can occur. It is also possible to make use of the last mentioned sealing principle by itself.

13 Claims, 12 Drawing Sheets

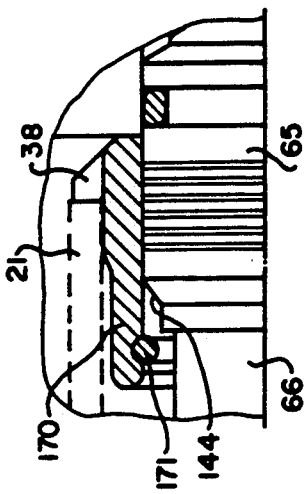
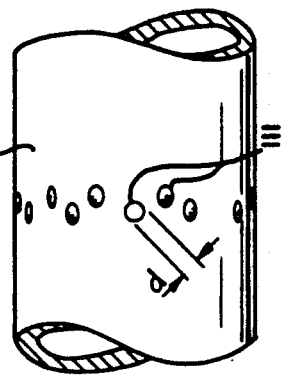
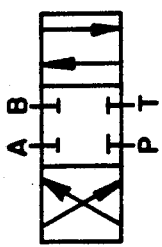
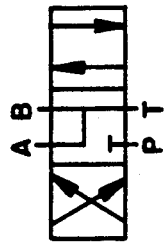
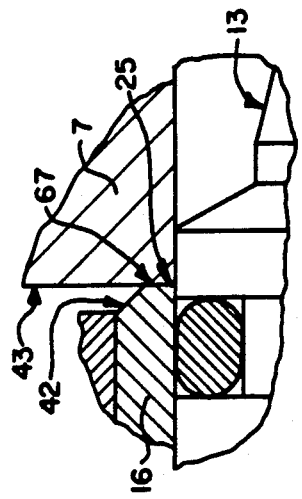
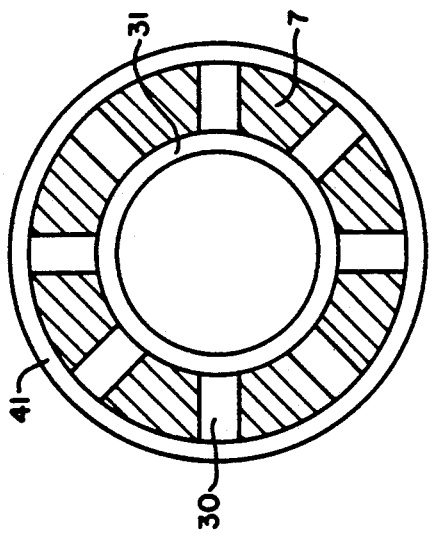
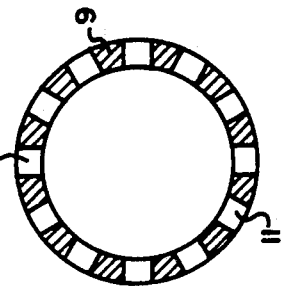

DIRECTIONAL CONTROL DEVICE

This is a division of application Ser. No. 07/073,364, filed July 10, 1989, now U.S. Pat. No. 4,832,081 which is a continuation of U.S. Ser. No. 06/800,074 filed as PCT EP85/00074 on Mar. 1, 1985, now abandoned.

The invention relates to a directional control valve having slide seals.

As is known, start, stop and direction of flow of a pressure medium is controlled by means of a directional control valve, and thus the direction of movement of a user is determined. It is generally distinguished between directional poppet valves and directional spool valves. Directional poppet valves have, in principle, the advantage of providing a leak-free closing. Leak-free closing cannot be achieved with spool valves due to the tolerance required between spool and housing.

In accordance with the first aspect it is an object of the invention to provide a directional spool valve, in particular a piston type spool valve such, that a leak-free operation is possible. The directional spool valve of the invention, specifically the directional piston-type spool valve combines the advantage of the directional poppet valve of being leak-free with the inherent advantages of the directional spool valves, specifically the relative simple design of the spool valves and the possibility to provide a plurality of control functions. For example, the piston type directional spool valve of the invention can be used for realizing a 4/3, a 3/3, a 4/2 and also a 3/2 directional spool valve.

So as to achieve the leak-free condition, the invention provides for seals (gaskets) in the spool as well as in the housing, with means being provided for protecting said seals, so that the seals will flawlessly operate over long periods of time. Details of this aspect of the invention are specifically referred to in the claims.

In accordance with said first aspect of the invention a directional valve is provided. Said valve comprises a pressure guiding element arranged on a spool, so as to direct the pressure in an outward direction onto a seal (housing seal) arranged in the housing; further, a piston spool seal located in the piston spool is protected with respect to damages by means of a protective element.

In accordance with a second aspect of the present invention sealing means are used together with the pressure guiding element which assures that the pressure is directed outwardly; said sealing means are adapted to separate certain ports. The sealing means are provided in the form of one (or a plurality of) seat (or seats) on the control spool (piston) and one (or a plurality of) seat (or seats) on the housing adapted to cooperate with said seat (or seats) on the control piston. Said seal means can also be provided in the form of control bores in the housing, control bores which cooperate with a seal in the spool.

It is, for example, possible to use a pressure guiding element on the spool together with a seal arranged in a housing for providing a connection and a sealing condition, respectively, between a user and the tank, whereby the sealing condition and the connection, respectively, between the pump and the user is provided by a seat of the housing which cooperates with a seat on the control spool. Preferrably, the seat on the control spool is movable with respect to the control spool.

Further, in accordance with the second aspect of the invention a directional spool valve is provided in general terms such that a connection and a separation, respectively, between predetermined ports is provided by sealing means having one or a plurality of seats on the control spool and one or a plurality of corresponding seats on the housing, with said seats cooperating for the purpose of providing a seal between said seats.

In accordance with a third aspect the invention relates to a 2/2 directional control valve (a so-called logic valve), and in particular to such a logic valve which is adapted for being used with pure water or with hydraulic liquids containing a large amount of water. Oil logic valves of different types are known for a long time. Logic valves for liquids containing a high amount of water are practically poppet valves with the valve seat being either made from steel or plastic material, while the poppet is made of steel. On the other hand it is also known to manufacture the poppet of plastic material and to use it together with a valve seat made of steel. Spool valves of the logic type for liquids containing a high amount of water did not succeed in practice, inasmuch as said valves are not adapted to achieve high switching numbers. A disadvantage of the steel seat/steel poppet design resides in the fact that even for the smallest scratches on the seat surface the liquid containing a large amount of water will flow in large volumes when the valve is closed due to the low viscosity; said flow will occur at a high rate. For said reason, the sealing surface will be washed out in a short period of time due to jet erosion and cavitation.

In accordance with a third aspect of the invention a logic valve for liquids containing a large amount of water and for pure water is provided, a valve which is adapted to provide for an extremely large number of switching operations not achieved so far. The logic valve of the invention is intended to allow not tens of thousands, but hundreds of thousands, even millions of switching operations.

Compared with the known logic poppet valves for liquids containing a large amount of water, the logic valve of the invention is designed to have a smaller size. Due to the plastic material-sealing seat-technique of the known hydraulic valves for water a smaller cross section is provided for the flow simply due to the fact that the load which can be taken up by the plastic material is small (considering the momentary closing of the poppet), so that the plastic material seat has to be designed to be relatively wide. The momentary load occuring during closing operation is taken up in case of the slide seal logic valve not by the sealing means (seat surface), but by a steel ring, a steel ring which is located outside of the seal surfaces. The seat width for plastic material can be up to 10 times larger than the corresponding seal widths for steel. On the other hand, a plastic material seat is desirable for liquids containing a large amount of water, for instance in mining applications, because such a plastic material seat provides for a so-called soft seal. A soft seal is supposed to be less sensible with respect to entrained dirt particles due to the fact that said particles are "embedded" in said soft seat. The present invention provides for such a soft seal for a logic valve of the spool type, i.e. the invention provides for a so-called 2/2 directional slide seal logic valve.

In general terms, according to this aspect of the invention it is an object of this invention to overcome the disadvantages of the logic valves for liquids containing a large amount of water.

It should be noted that the valves provided according to the two first mentioned aspects of the invention can also be used in particular for liquids containing a large amount of water or for pure water itself.

In accordance with the third aspect the invention provides for a 2/2 directional valve (logic valve) particularly adapted for the use in connection with HWF (with HWF hydraulic liquids containing a large amount of water are designated) liquids, said valve comprising the following:

a valve housing, a longitudinal bore, and two ports for flow medium;

a spool arranged in said longitudinal bore and movable between a valve opening position and a closing position with the valve opening position providing for a connection between said two ports, while the closing position provides for a separation between said two ports, and sealing means for providing a sealing effect between said two ports, said sealing means comprising on the one hand side a plurality of radial openings in the spool and adjacent to the spool in the valve housing, respectively, and that said sealing means further comprising an elastic plastic material seal in said valve housing and said spool, respectively. The elastic plastic material seal is preferrably formed by Turcon-ring, a ring which is placed in an annular groove in the spool and in a surface of the valve housing facing towards the spool, respectively, said Turcon-ring being elastically pressed against its cooperating component. Generally speaking, an O-ring is placed under the Turcon-ring and presses the turcon-ring resiliently against the appropriate cooperating surface.

Additional advantages, objects and details of the invention may be gathered from the following description of embodiments shown in the drawing; in the drawing:

FIG. 5 is a cross-sectional view of a bushing used in the two embodiments and adapted to receive the spool, said cross-sectional view being taken in the area of the tank port;

FIG. 6 is the symbol of the directional valve realized by the embodiment shown in FIGS. 1 and 2;

FIG. 7 is the symbol of a directional control valve realized by the embodiment of FIGS. 3 and 4;

FIG. 8 is a cross-sectional view of a sleeve surrounding the spool, the cross-sectional view being taken in the area of radial bores in said sleeve;

FIG. 9 is a detail of the two embodiments, the detail showing the area of a control edge of the pump port space;

FIG. 10 shows another arrangement of the radial bores shown in FIG. 8;

FIG. 11 shows another design of a spring plate which can be used in connection with the two embodiments;

Figure 1:
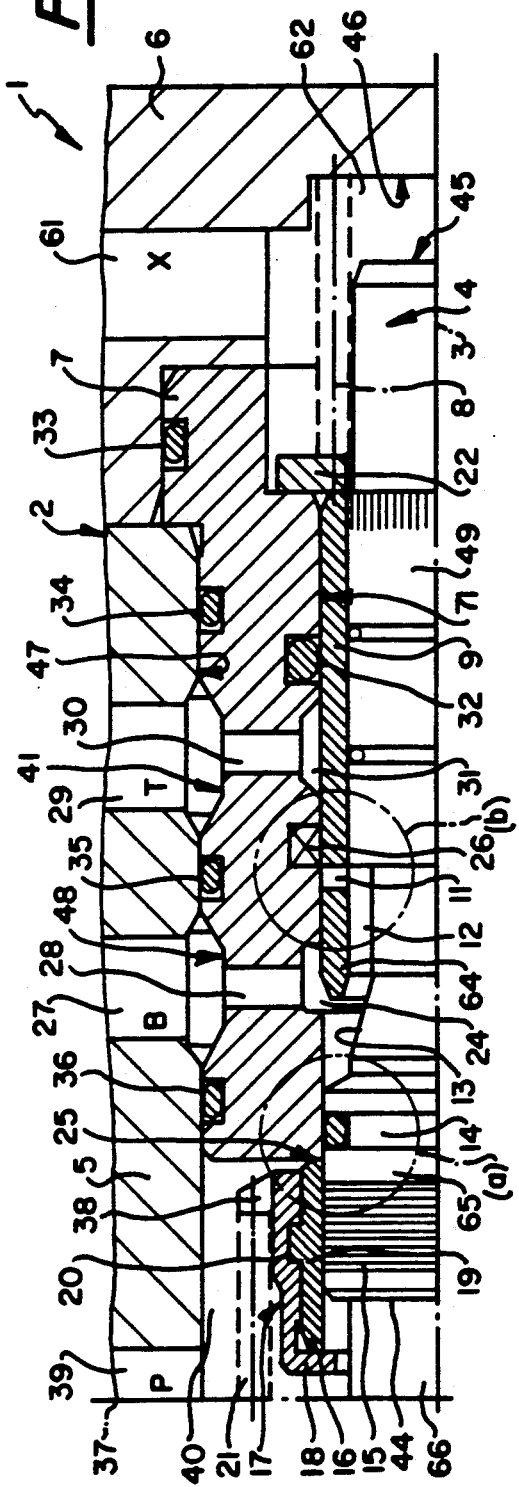
FIG. 1 is a longitudinal section of a 4/3 directional control valve of the invention in its "zero" or neutral position, with only one quarter of the entire cross-section being shown.
Figure 2:
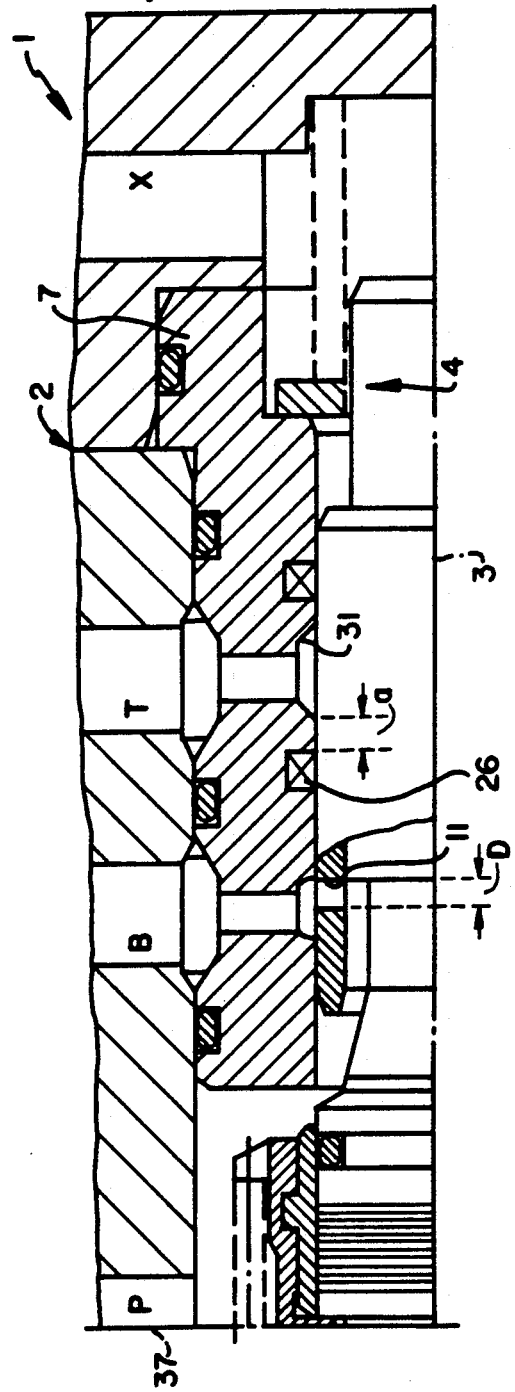
FIG. 2 is a section similar to FIG. 1 showing the 4/3 directional valve of the invention in its operating position referred to by "II" in FIG. 6.
Figure 3:
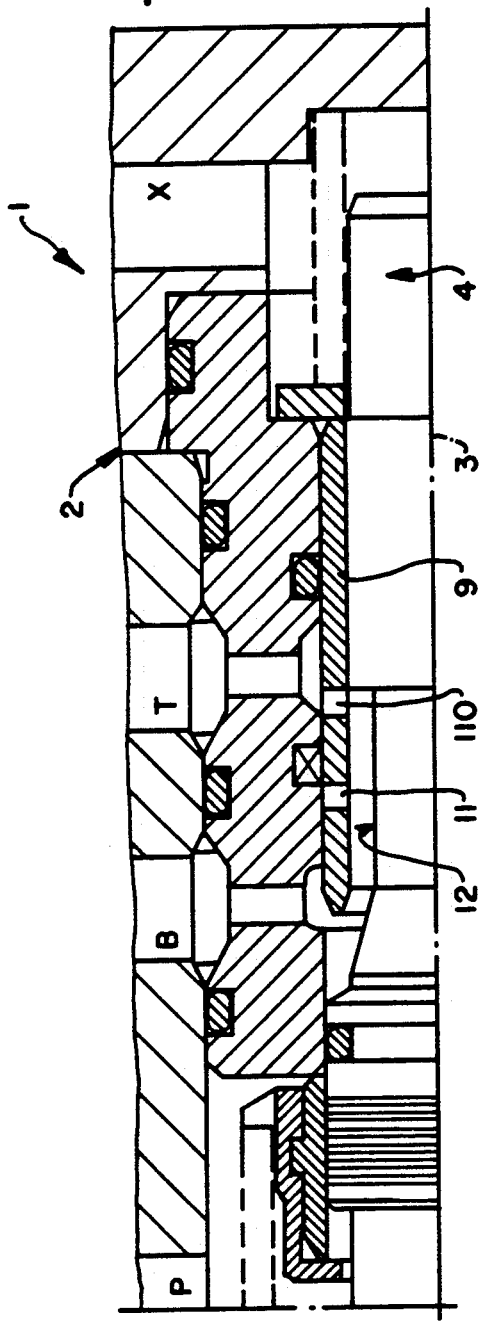
FIG. 3 is a sectional view of a second embodiment of a 4/3 directional valve of the invention shown schematically in FIG. 7.
Figure 4:
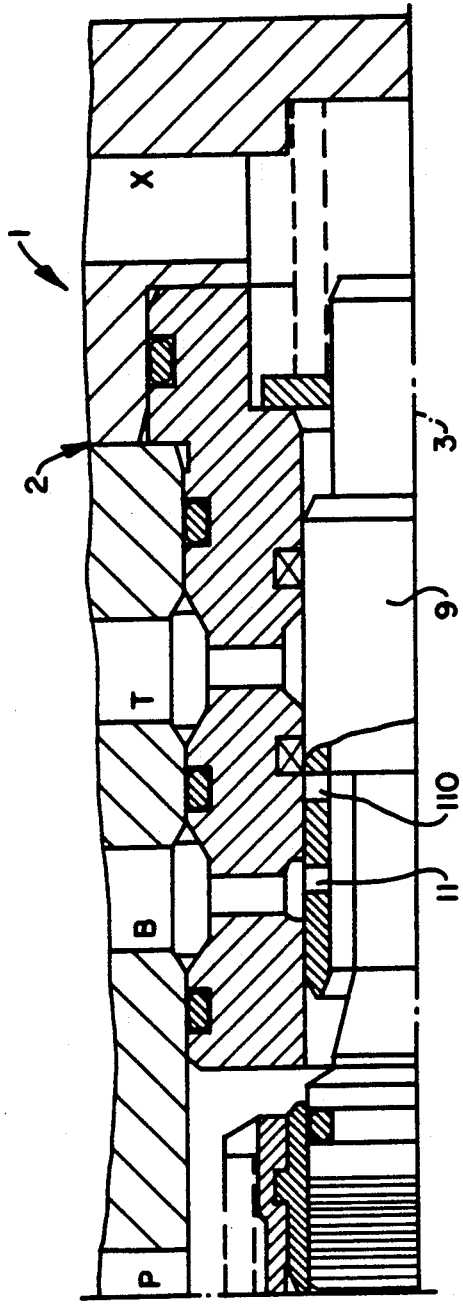
FIG. 4 is a cross-sectional view similar to FIG. 3 showing another operating position referred to in FIG. 7 by "II"

In the following description of the drawings FIGS. 1 and 2 relate to a first embodiment, and FIGS. 3 and 4 relate to a second embodiment. The first embodiment shown in FIGS. 1 and 2 is a 4/3 directional control valve intended to realize the functions of the symbol of FIG. 6. The embodiment of FIGS. 3 and 4 is also a 4/3 directional control valve which is intended to realize the functions of the symbol of FIG. 7.

Initially, reference is made to the embodiment of FIGS. 1 and 2. FIG. 1 discloses the directional control valve of the invention in the form of a 4/3 directional control valve 1 in a cross-sectional view and in the neutral position designated "O" in FIG. 6. So as to obtain the entire cross-sectional view of the valve it is necessary to imagine that the cross-sectional view of FIG. 1 would have to be mirrored about the center line 3 and again about the line 37 of symmetry. FIG. 2 shows the directional valve 1 in an operating position; again for a complete cross-sectional representation the cross-sectional view of FIG. 2 would have to be mirrored about the center line 3 and also about the line 37 of symmetry. The latter mirror-like reflection would not be true for the spool 4 yet to be described and (also not for elements 22, 16 and 17) inasmuch as the spool 4 is in FIG. 2 not in its neutral position but in its one operating position. Said operating position is designated "II" in the symbol of FIG. 6, i.e. a pump port space 40, which is yet to be described, is connected with one user B, while the other user A is connected with the tank T.

The operating position designated "I" in the symbol of FIG. 6 is not shown in a sectional view. This operating position would be present if the spool 4—see FIG. 1—would abut with its right-hand head 45 at an abutment surface 46 of a cover member 6.

Following these initial comments the first embodiment of FIGS. 1 and 2 disclosing a 4/3 directional control valve will now be described. The 4/3 directional control valve 1 comprises a valve housing 2. In said valve housing the spool 4 already mentioned, is reciprocally mounted along the center line 3. The valve housing 2 has a generally circular cylindrical or rectangular shape and comprises a main housing member 5. In the center bore 47 of the main housing member 5 a bushing 7 is sealingly located. A cover member 6, already mentioned, encompasses the one end of the bushing 7 and is mounted to the main housing member in a manner not shown. As is clear from the initial remarks, there is also provided another cover member diametrically opposite to the cover member 6. A seal 33 provides a sealing effect between the cover member 6 and the bushing 7.

It should be noted that there is also provided in a mirror-like fashion with respect to the bushing 7 another second bushing which is not shown and which is located in a mirror-like fashion with respect to the line 37 of symmetry.

In the area of the line of symmetry 37 a pump port bore 39 extends through the main housing member 5; said pump port bore 39 ends in the pump port space 40 already mentioned. The pump port space 40, in turn, is defined by the main housing member 5, the two bushings 7 and the spool 4, yet to be described in detail. Further, a user port bore 27 (for the user B) extends through the main housing member 5, said bore 27 ending in an annular recess 48 of the bushing 7. The annular recess 48 is, in turn, connected via a plurality of radially extending connecting bores 28 to a user port space 24 in the form of an annular groove at the inner surface of the bushing 7.

Similarly, a tank port bore 29 extends radially through the main housing member 5 and ends in an annular recess 41 at the outer circumference of the bushing 7. The annular recess 41, in turn, is connected via a plurality of radially extending connecting bores 30—see FIG. 5—with a tank port space 31, said tank port space 31 having the form of an annular recess broadening in axial direction of the valve 1. The tank port bore 29 is in connection with the tank T.

Finally, the radial bore 61 extends through the cover member 6 and is connected at its inner end with a spool head space 62. The space 62 is defined by the cover member 6, the bushing 7, and the spool 4. Located within the spool head space 62 is a coil pressure spring 8 surrounding the spool 4. Spring 8 abuts in its rest position shown in FIG. 1 via a washer (centering disc) 22 at bushing 7 and spool 4 on the one hand side and at an abutment 46 of the cover member on the other hand. It is quite obvious that a corresponding spring is also provided at the oppositely located not shown end of the spool 4. A control port is designated by "X".

On both sides of the annular recess (tank port space) 31 seals 26 and 32, respectively, are provided in annular grooves of the bushing 7. Between the annular groove adapted to receive seal 26 and the annular groove 36—see FIG. 2—a bushing 7 defines an annular land having an axial length "a". In the embodiments shown in FIGS. 1 to 4 "a" is larger than the diameter of bores 11 (yet to be described) located in spool 4 (see FIG. 2).

A center bore 71 extends in longitudinal direction through said two bushings 7 and the spool 4 (already mentioned) is reciprocally mounted in said bore 71. Again, it is quite obvious that one has to imagine that the representation of spool 4 has to be supplemented towards the left and (again in the drawing) towards the bottom. The spool (piston) 4 comprises a rod member 49 with two pressure guiding elements in the form of sleeves 9 being mounted thereon. The sleeves 9 are mounted on the rod portion 49, for instance by means of bracing. Sleeve 9 comprises a plurality of radial bores 11 as is particularly shown in FIG. 8. The bores 11 and an inner end 64 of the sleeve 9 extend partially over an annular recess 12, 13 in the rod portion 49. This recess may be divided in a first recess 12 and a second contiguous recess 13. Preferrably, the first recess 12 has a horizontal base surface, and the second recess 13 has an inclined base surace and is open towards the inner surface of the sleeve 7. It is conceivable that different from what is shown, the spool 4 comprising the sleeves 9 and the rod portion 49 is formed as a single piece with the required recesses 12, 13 being machined out of said single piece.

In the direction to the line of symmetry 37 and adjacent to the recess 12, 13 a seal 14 in the form of an O-ring is provided in an annular groove. Said seal 14 seals the pump port space 40 with respect to the recess 12, 13. In the neutral position of the spool 4 shown in FIG. 1 the seal 14 is located adjacent to a control edge 25 formed by bushing 7. Details are shown in FIG. 9.

Following the seal 14, the rod portion 49 defines a bearing section 65 which, in turn, is followed by a connecting section 66 having a smaller diameter. In the bearing section 65 relief grooves 15, which are well known in the art, are formed.

Located on the bearing section 65 is, with a small amount of play, a protective element in the form of a sleeve 16; said sleeve 16 comprises approximately in the middle a radially outwardly extending collar 19. Located at the outer circumference of the sleeve 16 is a spring dish element 17; the spring dish element 17 is (as is not shown) divided in axial direction into two parts and surrounds with an annular groove 20 said collar 19. Also, a radially extending part 18 encompasses the inward end of the sleeve 16. The outer end of the split spring dish element 17 is provided with a radially extending collar 38. A coil pressure spring 21 surrounds and keeps together the two-part spring dish element 17 and abuts with its one end at said radial collar 38, while the other end of said spring 21 abuts at a diametrically oppositely located collar 38 (not shown) of the second spring dish element which is also not shown. The coil pressure spring 21 presses the two sleeves 16 with their abutment surfaces 67—see FIG. 9—against the corresponding abutment surfaces 43 of the bushings 7. The abutment surface 67 is provided with an inclination 42 which extends inwardly in an inclined manner.

The directional control valve as shown comprises two critical sealing elements from a point of view of the flow and the pressure; these two sealing elements are the seal 14 and the seal 26. In FIG. 1 said two critical sealing zones have been encircled and are designated (a) and (b). In accordance with the present invention the two sealing systems, the sealing system (a) and the sealing system (b) will be used in a single apparatus, preferably in a directional control valve. The use of the sealing systems of the invention will provide for a safe, leakage-free operation of the valve. The used seals of the invention will not be harmed during the switching operation when control edges or control bores are passed by the piston (spool) under pressure.

Initially, the sealing system (a) will be discussed in connection with a switching operation of the directional control valve 1 from the switching position shown in FIG. 1 to the switching position shown in FIG. 2. The transition from the switching position of FIG. 1 to the switching position of FIG. 2 means in the symbolic representation of FIG. 6 transition from "O" to "II". Therefore, if it is desired to connect the pump port space 40, which is connected to the pump P, with the load port space of the load B, then the spool 4 has to be moved in the representation of FIG. 1 towards the left. During the initial leftward movement of the spool 4, the seal 14 is completely moved under the sleeve 16 until eventually the spool shoulder 44 provided at the bearing section 65 abuts against the radially extending part 18 of the spring dish element 17; as a consequence, the radially extending part 18 will be moved together with the sleeve 16 contrary to the force of the spring 21 towards the left-hand side so far until the not shown left head end (which corresponds to the right head end 45) of the spool 4 abuts against the corresponding abutment surface 46. In the beginning of the leftward movement, the sleeve 16 was pressend with its abutment surface 67 against the abutment surface 43 of the bushing 7 due to the force of the spring 21 as well as due to the pressure of the pressure medium in the pump port space 40. Due to the fact that the piston shoulder 44, which is located on the left-hand side in FIG. 1, abuts at the radially extending part 18 only after the seal 14 is already completely under the sleeve 16, the seal 14 is not subjected to the flow pressure of the pressure medium flowing from the pump port space 14 to the recess 12, 13, see FIG. 2.

In accordance with the invention, it is not only possible to connect the pump P with the load B and to bring the user B in zero position with the tank T, it is also possible, due to the use of the seal system (b), to switch into the other direction so that, for instance, the 4/3 directional control valve of the invention may be realized.

The sealing system (b) will come into function when a switching operation occurs from the switching position of FIG. 1 into the switching position of FIG. 6 designated "I". For this purpose, the spool 4 in FIG. 1 has to be moved towards the right until it abuts with its head-end 45 at the abutment surface 46. During this movement the shown spring 8 is compressed and the arrangement not shown but present in a symmetric position and comprising sleeve 16 and divided spring dish element 17 is also moved for a distance by means of the spool shoulder 44 which is also not shown.

It is important to note that during the rightward movement of the spool 4, the pressure coming from the load B is guided from the inside towards the outside against the seal 26. This is done via said radial bores 11 such that the seal 26 is pushed away in radial direction. It is important that the pressure comes from the load port space 24 and is guided from the inside towards the seal 26. If the pressure were guided via the tank port space 31 to the recess 12, 13, then the seal 26 would certainly be destroyed because the pressure would press the seal into the bores 11.

FIGS. 3 and 4 disclose a second embodiment of the invention. The second embodiment also relates to a 4/3 directional control valve which differs from the first embodiment only insofar as there is different design for the neutral position "O", a neutral position which is designed in accordance with the symbol of FIG. 7. This means that in the neutral position the two users A and B are connected with the tank. So as to achieve this function, the sleeve 9 is provided with a second set of radial bores 110 and the recess 12 having a horizontal base surface is correspondingly extended so that the configuration shown specifically in FIG. 3 is achieved. FIG. 4 discloses the switching position designated "II" in FIG. 7. The switching position designated by "I" in FIG. 7 is again not shown. The latter position would be reached if the spool 4 were moved rightwardly in FIG. 3. It should be noted that the same comments and reference numerals apply to the embodiment shown in FIG. 3 and 4 as were used in connection with the embodiment of FIGS. 1 and 2. Also, the comments regarding FIGS. 5, 8 and 9 are appropriately applicable for the embodiment shown in FIGS. 3 and 4.

Even though the invention was described here in connection with the 4/3 directional control valve, the invention can be used similarly for other types of valves, specifically for a 4/2, a 3/3 and also a 3/2 directional control valve.

Due to the use of the two above-mentioned sealing principles (a) and (b), it is generally possible to apply the invention to almost every spool-valve design where the critical seals will be subject only to a small or no abrasion.

A description of FIGS. 5, 6, 7, 8 and 9 was already given in connection with the description of the two embodiments shown in FIGS. 1 and 2 and 3 and 4, respectively.

FIG. 10 discloses a different design for the holes or radial bores 111 provided in sleeve 9.

In the framework of the embodiment of FIGS. 1 and 2, the radial bores 11 may be replaced by the radial bores 111 of FIG. 10. In accordance with a preferred embodiment of the invention, the effective width for passage of fluid defined by the two circumferential rows of radial bores is less than the length "a". Preferably, this is achieved by providing radial bores 111 which have a diameter "d" smaller than the diameter "D" of the radial bores 11.

In the framework of the embodiment of FIGS. 3 and 4, the radial bores 11 as well as the radial bores 110 may be replaced by the radial bores 111 of FIG. 10. The radial bores 111 are arranged in two circumferential rows which are axially displaced with respect to each other so that an approximately zigzag-shaped arrangement is achieved. Due to this arrangement, the strength of the sleeve 9 is influenced to the lowest possible degree.

FIG. 11 discloses another preferred design of a spring dish element 170; the spring dish element 170 is slidably located on the bearing section 75 adjacent to the connection section 66. The spring dish element 170 is of integral design inasmuch as it does not comprise a radially extending part 18 as does the spring dish element 17. It is possible to simply move the spring dish element 170 onto the bearing section 65. Due to the insertion of a spring ring 171, the axial movement of the spring dish element 170 is limited by the abutment of the spring ring 171 at a spool shoulder 144. The spring dish element 170 further comprises a collar 38 adapted for abutment with the spring 21 as is clearly shown in connection with the embodiment of FIGS. 1 and 2. The design of the spring dish element 170 of FIG. 11 makes the sleeve 16 of FIGS. 1-4 unnecessary. The function of the sleeve 16 will be taken care of by the spring dish element 170.

Another possibility for the design of the spring dish element will be described in connection with FIG. 11.

This spring dish element—not shown—could be of integral design like the spring dish element 170 and would be located in FIG. 11 in the left area, at a location where the spring ring 170 would be provided; it would comprise a plurality of springy arms which would—as shown in FIG. 11 for the spring ring 171—extend downwardly so as to abut at the spool shoulder 144. Due to the spring action of said arms, it would, however, be possible to move the generally integral spring dish element over a bearing section 65 having a larger diameter than the connecting section 66 so that the spring arms provided on the left-hand side in FIG. 11 would move into the connection section 66.

In connection with FIGS. 12-25, embodiments of directional spool valves in accordance with a second aspect of the invention will be described. In fact, embodiments having an elongated spool will be disclosed. Similarly, the principles of the invention may also be used for valves having a rotary spool. The directional control valves to which the present invention preferably relates typically have a longitudinal bore arranged in a housing, said bore being interrupted by annular channels. Thereby, control edges are defined in the housing. A moveable control spool is placed in the longitudinal bore and connectes the annular channels in the housing with each other or separates said channels form each other.

Normally, the sealing between the individual annular ring channels is provided for by the play of the fit between the spool and the housing; as a consequence, in comparison with poppet valves, a hermetic seal is not possible. The present invention is specifically directed to a novel improved seal between individual ring channels.

In accordance with one suggestion of the invention, a pressure guide element is provided at the spool and cooperates with a seal in the housing; in combination therewith, at least one control spool seal surface is provided which cooperates with at least one housing seat surface.

In accordance with another provision of the invention, a directional control spool valve is provided with sealing means which comprise at least one control spool seat surface, a control spool seat surface which cooperates with at least one housing seat surface. In accordance with another suggestion of the invention, control bores are provided, radially extending through said housing and connecting one or more ports with the longitudinal bore of the valve housing. A seal in the spool serves for the sealing of said control bores and can also be moved past said control bores.

Following this initial remark, the individual embodiments will be discussed in detail, with similar reference numerals used for similar components.

Figure 12:
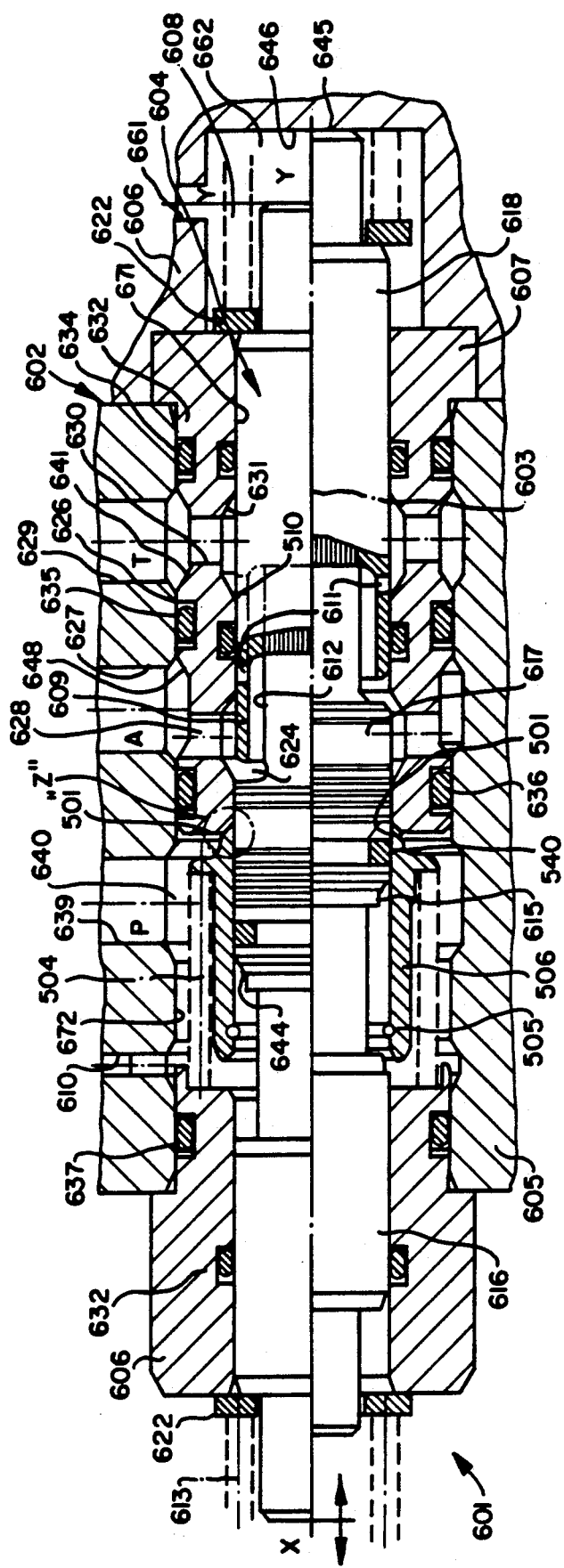
FIG. 12 is a cross-sectional view of another embodiment of a 3/3 directional control valve of the invention.

FIG. 12 shows a cross-sectional view of a directional spool valve (in the following referred to as a control valve) 601 which comprises a valve housing 602 having a longitudinal bore 671, 672. In said longitudinal bore 671, 672, an elongate spool (in the following description referred to as a "spool") 604 is mounted for a reciprocal movement along a center line 603.

The valve housing 602 comprises a main housing member 605 having said longitudinal bore 672. A bushing 607 is inserted from one side into said longitudinal bore 672. The bushing 607 defines said longitudinal bore 671. The bushing 607 is sealed with respect to the housing 605 by means of seals 634 to 637. The bushing 607 and the main housing member 605 define the longitudinal bore 671, 672 of the entire valve 601. Further, the housing 602 is closed by cover members 606 which extend around the ends of the spools.

Each of said cover members 606 defines a spool end space 662 (only the right-hand spool space is shown for reasons of simplicity), a spool end space 662 which is connected by means of a radial bore 661 with a port Y and X, respectively, for purposes of control. The cover member 606 defines further an abutment surface 646 for the appropriate head end 645 of the spool 604. Further, in each of said spool end spaces 662, each one compression spring 608, 613 is placed; each of said compression springs abuts with one end at an abutment surface 646 and with the other end at a spring dish element 622, said spring dish elements in turn being moveable by means of a shoulder of piston 604.

In the area of longitudinal bore 671, 672, port channels or port spaces are provided for the different (not shown) ports for pump P, user A and tank T. In the area of bore 672 a pump ring channel (pump port space) 640 is provided and in the area of the longitudinal bore 671 a user ring channel (user port space) 624 and a tank port space (tank ring channel) 631 is provided. The pump ring channel 640 is connected via a pump port bore 639 with the pump port P not shown. The user ring channel 624 is connected via a plurality of connecting bores 628 with a ring recess 648 in bushing 607; the ring recess 648 in turn is connected via a user port bore 627 with the proper user port A. Moreover, the tank ring channel 631 is connected by means of a plurality of connecting bores 30 with an annular recess 641 in bushing 607; the ring recess 641 in turn is connected via a tank port bore 629 with the proper tank port T. A check valve may be provided in the pump port bore as well as in the tank port bore. The ring channels 602, 624 and 631 each form control edges. The ring channel 640 forms a housing seat surface 501 yet to be described. The housing bore 610 is closed by a plug. The spool 604 comprises a head portion 611, a middle portion 617 having relief grooves 615 and another head portion 618.

It can be recognized that in accordance with the invention two different sealing systems are provided. The first sealing system provides for a sealing effect between the ring channel 640 and the space defined by the bores 672, respectively and the user ring channel 624. The second sealing system provides for a sealing effect between the user ring channel 624 and the tank ring channel 631.

Figure 14:
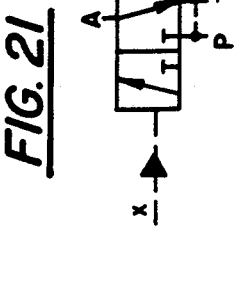
FIG. 14 shows a detail "Z" of FIG. 12.
Figure 22:
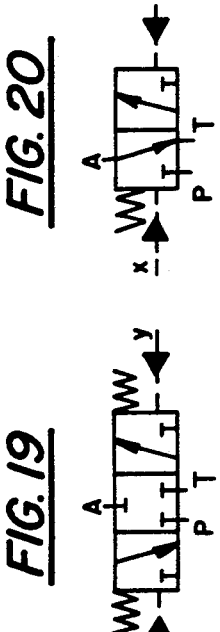
FIG. 22 is the symbol of a 2/2 directional control valve which can be realized with the embodiment shown in FIG. 16.
Figure 18:
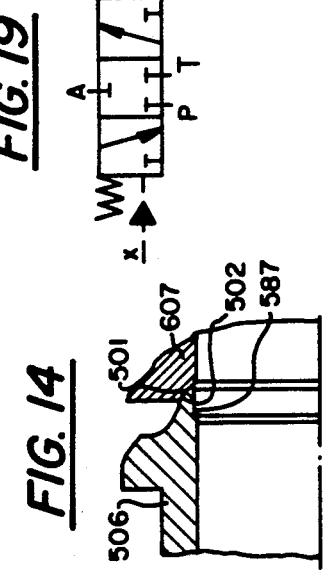
FIG. 18 shows the detail "X" of the directional control valve of FIG. 17.

The first sealing system comprises—see specifically FIG. 14—a seat sleeve 506 which defines a spool seat surface 502. The spool seat surface 502 in turn cooperates with the already mentioned housing seat surface 501 so as to provide a sealing effect.

The seat sleeve 506 is slidably mounted on the spool middle portion 17. A seal 540 is located in said sppol middle portion 17 and is in engagement with the inner circumference of the seat sleeve 506. A spool shoulder 644 is formed adjacent to a smaller diamter portion of the spool 604 and can cooperate with a coupling abutment 505 formed by a spring ring. The seat sleeve 506 is biassed by means of a spring 504 so that the seat surface 502 abuts against the housing seat surface 501. A recess 587 of the invention avoids during sealing engagement an adherence to the sleeve 604.

The second sealing system is formed by a pressure guide element 609 having the form of a sleeve. The sleeve 609 has the same outer diameter as does the center portion 617 of the spool and extends partially over a recess 612 in the spool middle portion 617. The sleeve 609 comprises a plurality of radial bores 611 which are uniformly distributed about the circumference.

In accordance with a special embodiment yet to be described, there is a second set of radial bores 510 provided in the sleeve 609. The second sealing system further comprises a seal 626 located in the housing. The radial bore 611 directs the flow or pressure medium radially outwardly so that the pressure also acts upon the seal 626 in radial direction, so that a damaging effect on the seal 626 is avoided. At appropriate locations, additional seals, for instance seals 632, are provided. With the embodiment of FIG. 12 different control valves may be realized, for instance a 3/3 or a 3/2 control valve.

FIG. 12 shows a symbol of a 3/3 control valve which can be realized according to the invention. This control valve is realized by the upper half of the cross-sectional representation of FIG. 12 provided that the set of radial bores 510 is not provided. In the neutral position disclosed in the upper half of FIG. 12, the pump, the tank and the user are each blocked. In case that the spool 604 is moved towards the left, then the spool shoulder 644 will move the seat sleeve 506 against the force of the spring 504 towards the left and lift the spool seat surface 502 off the housing seat surface 501. As a consequence, the pump ring channel 640 is connected with the user ring channel 624 and flow medium flows from the pump P to the user A. Inasmuch as the bores 510 are not existent, the tank T is blocked.

If, on the other hand, the spool 604 is moved towards the right, then the seal between the spool seat surface 502 and the housing seat surface 501 remains in effect and the radial bores 611 are connected to the tank ring channel 631. Thereby, the user A is connected with the tank T while the pump P remains blocked. The latter condition is shown in the lower half of FIG. 12.

Figure 13:
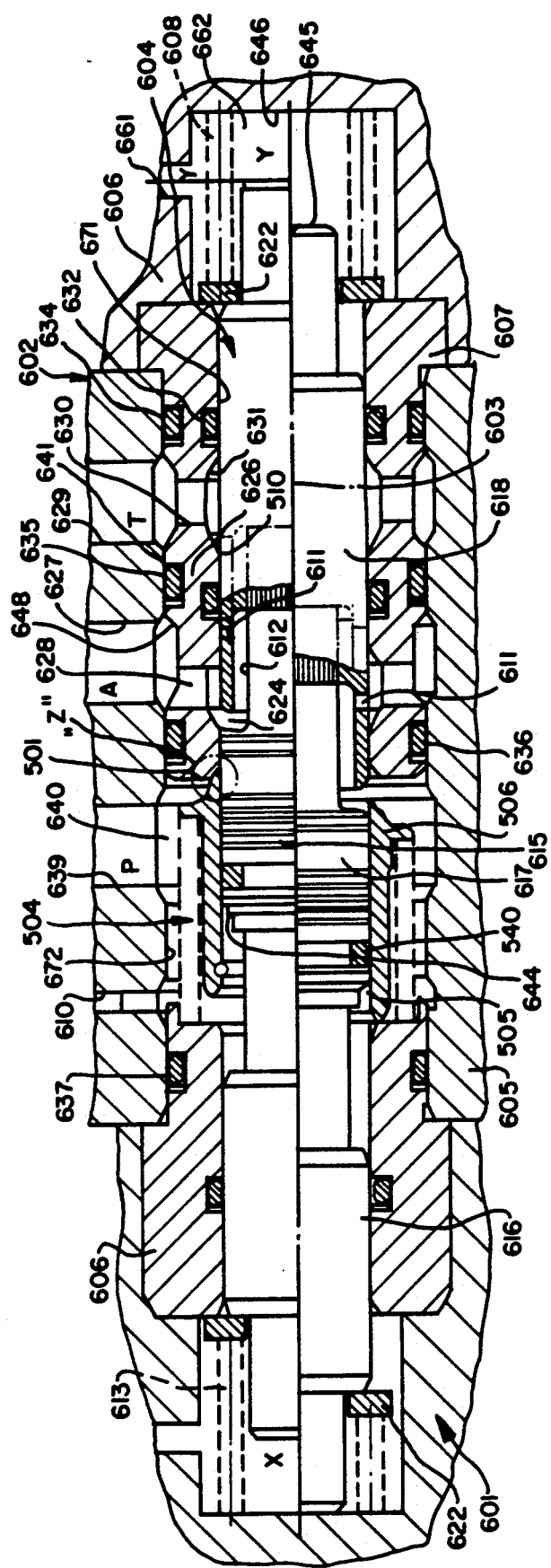
FIG. 13 shows the embodiment of FIG. 12 in a different switching position.
Figure 20:
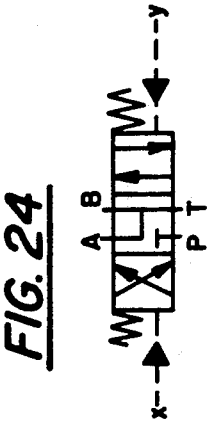
FIG. 20 is a symbol of a 3/2 directional control valve which can be realized with the embodiments of FIGS. 12 and 17 (with the radial bores 110 being present)
Figure 23:
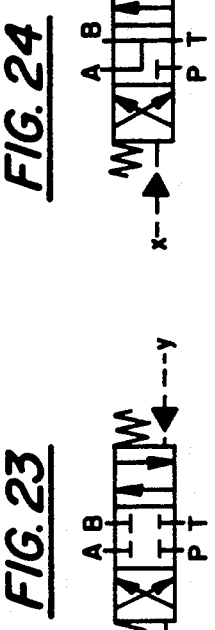
FIGS. 23 and 24 show the symbols of two 4/3 directional control valves which can be realized in accordance with the invention (with a mirror-like arrangement of a second user and a second tank)
Figure 25:
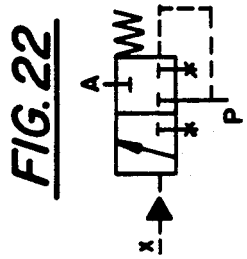
FIG. 25 is a symbol of a 3/2 directional control valve which can be realized in accordance with the invention, provided that the bores 110 are used (and provided that a second user and a second tank is arranged in a mirror-like fashion)

If instead of radial bores 611 the radial bores 510 are present in accordance with the upper half of the cross-sectional representation of FIG. 13, then a 3/2 control valve in accordance with the symbol of FIG. 20 is realized. The upper half of FIG. 13 discloses a switching position of the valve 601, in which A is connected with T and P is blocked. The lower half of FIG. 13 discloses a second switching position in which P is connected with A and T is blocked. A movement of the spool 604 in FIG. 12 towards the right against the force of spring 608 is not provided for and also makes no sense.

Another embodiment of a control valve 500 will be described in connection with FIG. 15. As far as possible, similar reference numerals will be used as were used in FIG. 12 so that the corresponding elements need not be described again. In contrast to the embodiment of FIG. 12, the longitudinal bore 653,654 is formed in its entire length by the bushing 607. The longitudinal bore comprises two parts, a first longitudinal bore part 653 and a second longitudinal bore part 654, the bore part 653 having a somewhat larger inner diameter than the second bore part 654. The longitudinal bore 653, 654 is closed at one end by means of a plug 651 which is provided with a seal 652. The other end is provided with a cover portion not shown but similar to the cover portion 606 of FIG. 12. In an axial cavity 55 of the spool designated here by the reference numeral 614, two compression springs 620, 621 are arranged in series; said springs being in abutment with the not shown cover member and allowing for a movement of the spool 614. The spool 614 may be moved, for instance, by applying a control pressure X via bore 656; said bore 656 is in connection with the ring channel 657, a ring channel which ends in turn at the head member 616. In this embodiment, for all practical purposes only a movement of the spool 614 towards the right-hand side is possible. The cover member not referred to by a reference numeral comprises an opening corresponding to the bore 661 for the control pressure Y.

The spool 614 comprises three adjacently located sections, the head portion 616 already mentioned, a middle portion 617 and another head portion 618. The head portion 616 comprises a diameter D of for instance 18.4 mm while the diameter D3 of the head portion 618 comprises for example 16 mm. The middle or center portion eventually comprises a diameter D2 which is for example 18 mm and somewhat smaller than the diameter D1. In the head portion 616 a seal 619 is located. Two sealing systems are also used for this control valve: a first sealing system using a pressure guide element 690 and a second sealing system comprising a spool seat surface 519 and a housing seat surface 511.

It can be recognized that the user ring channel 24 defines two control edges 512, 515. The spool 614 defines adjacent to the spool seat surface 519 a control edge 514 which cooperates with the control edge 512. The radial openings 611 are also forming control edges 66 which cooperate with the control edge 515.

Figure 15:
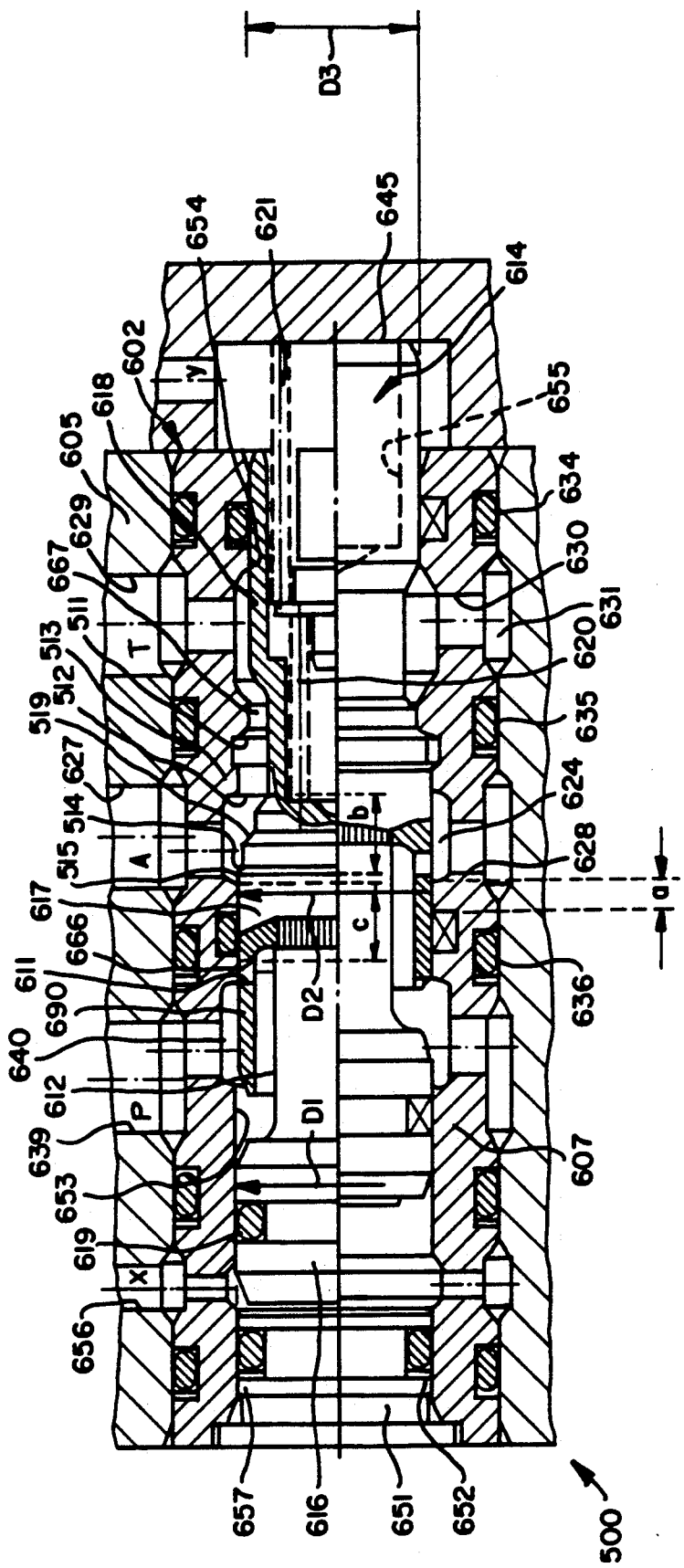
FIG. 15 shows a cross-sectional view of another embodiment of a 3/2 directional control valve of the invention.

In the upper part of FIG. 15 which discloses the initial switching position, the distance between the control edges 66 and the control edge 514 is designated "c"; the distance of the control edge 514 with respect to the control edge 512 is designated "b". The reference sign "a" refers to the distance between the control edge 515 and the edge of the seal 626 which is located the closest. Between the middle portion 617 and the head portion 618 a recess 667 is provided in the spool 614. In the embodiment as shown the control edge 514 is formed at the sleeve which forms the pressure guide 690.

In the embodiment shown, "b" equals "c", i.e., neutral-or zero-overlap exists.

In accordance with the invention, the control spool 614 will cooperate with a housing shoulder 513 comprising the control edge 512 prior to an engagement between its seating surface 519 and the housing seat surface 511; regarding the initial switching position, the distance b of the control edge 512 of the housing shoulder 513 with respect to the appropriate control edge 514 of the control spool 614 has such a size with respect to the distance c between the oppositely arranged control edge 515 at the housing and the control openings 611 of the pressure medium guide element 609 that depending on the size of the distance with respect to each other, a positive, zero or negative overlap is present.

Figure 21:
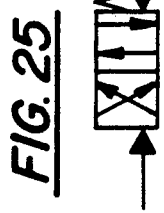
FIG. 21 is the symbol of a 3/2 directional control valve which can be realized with the embodiment shown in FIG. 15.
Figure 24:
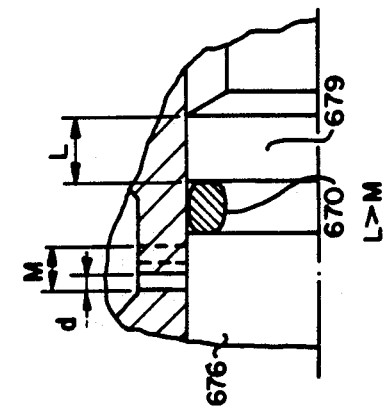

With the embodiment of FIG. 15 it is for instance possible to realize the 3/2 control valve of the symbol shown in FIG. 21. In the upper half of FIG. 15, the neutral or initial switching position is shown and the pump P is blocked while the user A is connected with the tank T. If the spool 614 is moved in FIG. 15 to the right, then the control edges 512, 514 come into interaction and the pump P will be connected via the radial bore 611 with the user A. As may be gathered from the lower half of FIG. 15, the spool seat surface 519 and the housing seat surface 511 provide the sealing between the user A and the tank T.

Figure 16:
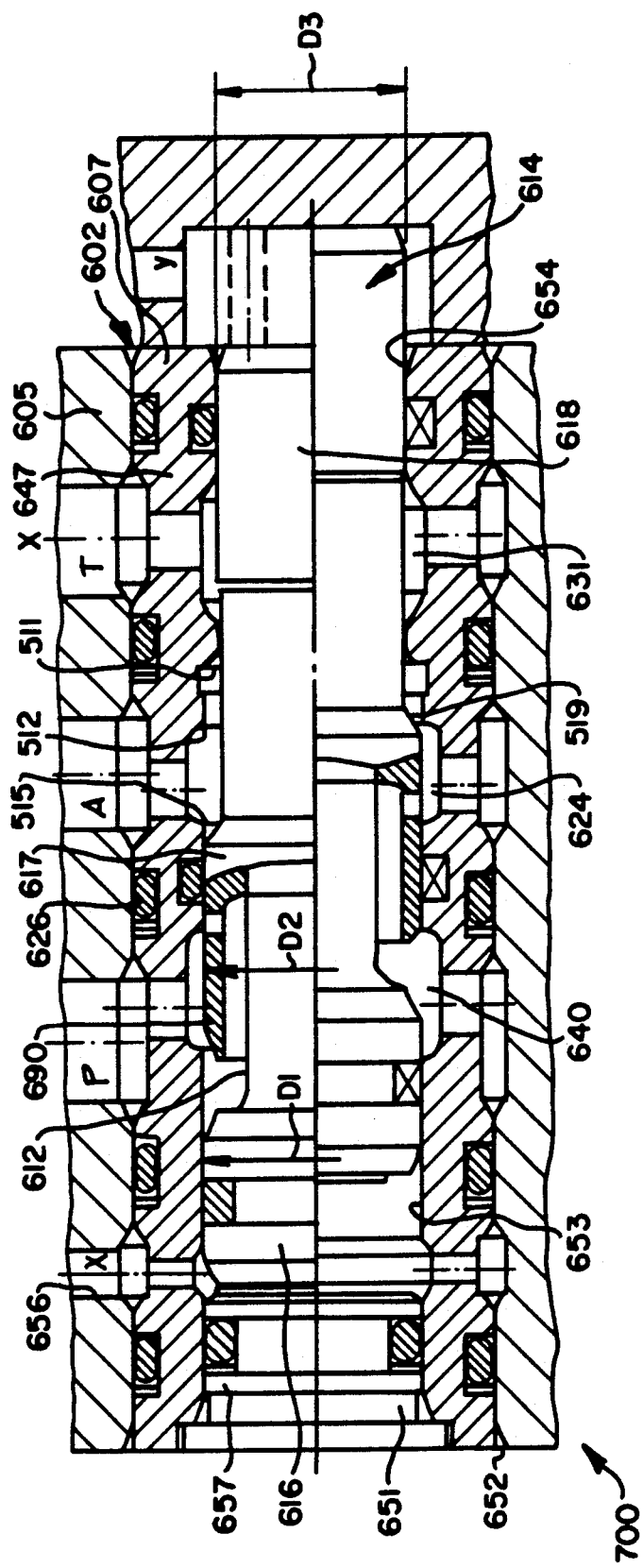
FIG. 16 is a cross-sectional view of a modification of the directional control valve of FIG. 15.

FIG. 16 discloses a special design 700 of the embodiment of FIG. 15 insofar as in FIG. 16 the port for the tank T is blocked, as is shown by the cross. This cross should not be confused with the "X" in the area of the port 656. With this embodiment of FIG. 16, a 2/2 control valve in accordance with the symbol of FIG. 22 may be realized. Only one sealing system 626, 690 is present. However, different form the embodiment of FIG. 15, the "seat" surface 519 and the housing-"seat"-surface 511 do not form a sealing system, with the consequence of lower cost.

Figure 17:
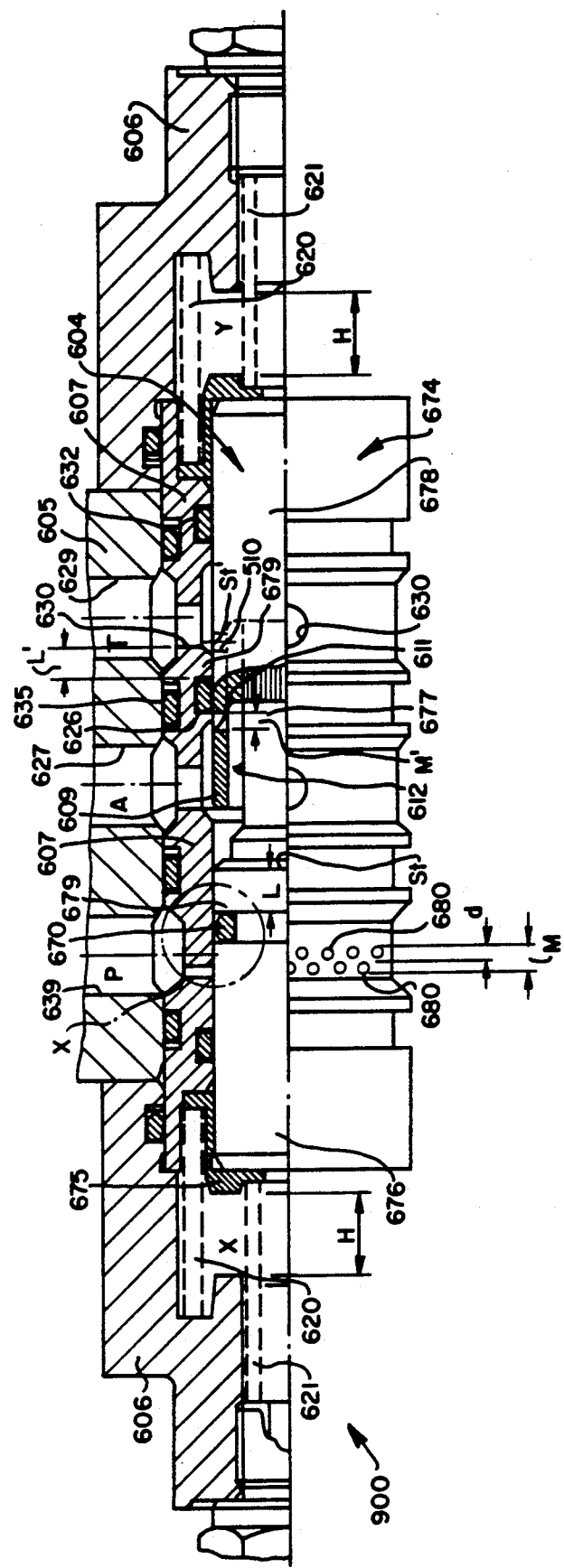
FIG. 17 is a cross-sectional view of another embodiment of a directional control valve of the invention.

FIG. 17 eventually shows a control valve 900 which again uses two different sealing systems. The control valve 900 comprises a number of circumferentially distributed radial bores 680 in the bushing 607. Preferably, two rows of radial borres 680 are provided, said rows being arranged with an axial distance and the bores are off-set with respect to each other. The radial bores 680 are located in the area of the bushing 607 where for the other embodiments already described the pump port-ring channel is located.

Spool 674 comprises a head portion 676, a middle portion 677 and another head portion 678. In the head portion 678 a seal 670 is located adjacent to an annular collar 679 in the spool. The annular collar 679 has a length L in the axial direction of the spool. The radial bores and the control bores 680, respectively form together with the seal 670 the one sealing system. The other sealing system is formed by the pressure guiding element 609, the radial bore 611 and the seal 626. The spool 674 is subject to the force of the compression springs 620, 621 and can be moved out of the position shown in FIG. 17 into the one or the other direction. The upper half of FIG. 17 shows a sectional view of the valve. The lower half of FIG. 17 is a plan view of the inner surface of the bushing 607. The stroke of the spool is designated "H". The compression springs 620, 621 already mentioned abut, on the one hand side, at spring dish element 675 and, on the other hand, at the appropriate cover 606.

In accordance with the invention, the length L of the collar 679 is larger than the distance M of the outer limits of the control bore 680; this distance M is also called the width of the area of bores. With the valve 900 of FIG. 17 the same valve functions may be achieved as is possible with the valve 601 of FIGS. 12, 13.

Figure 19:
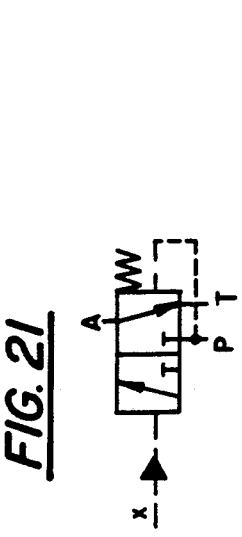
FIG. 19 is the symbol of a 3/3 directional control valve which can be realized with the embodiments shown in FIGS. 12 and 17 (provided that the radial bores 110 are present)

For instance, the 3/3 control valve of FIG. 19 is realized if in the construction of FIG. 17 the bores 510 are not present. The movement of the spool 604 from the rest position (where the user port A, the pump port P and the tank port T are blocked) shown in FIG. 17 towards the left connects pump P via bores 680, recess 612 and radial bores 611 with the user A, whereby at the same time tank T remains blocked. During the movement of the spool 604 towards the left-hand side, a damage of the seal 670 is avoided due to the existence of bores 680, bores which have a relatively small diameter compared with the width of the seal. In case that the spool 104 is moved from the rest position towards the right-hand side, the pump remains blocked, and the user A is connected via the recess 612 and the radial bore 611 with the tank T.

If the valve 900 of FIG. 17 is provided with radial bores 510 instead of radial bore 611, then a 3/2 control valve having the symbol shown in FIG. 20 is realized, with the spool being moveable only towards the left switching position. A movement of the spool towards the right-hand side is made impossible for this embodiment by designing the spool and the cover in such a manner that in the initial position (connection between A and T) the right-hand end of the spool is in abutment with the cover.

The control valves 601, 700 and 900 each comprise three service ports and different switching positions.

It should be noted that the present invention is preferably used for control valves having four service ports, two users A and B and a pump P as well as a tank T. Accordingly, it is possible to realize also a 4/3 and a 4/2 control valve, respectively. This is done by providing for the described embodiment another user port B left of the P port, and also another tank port T. In this manner, the valves represented by the symbols of FIGS. 23, 24 and 25 can be realized by a man skilled in the art without any problems.

The invention may be summarized as follows:

In accordance with the invention, a directional spool valve is provided making use of two different means of sealing. First sealing means comprise a pressure guide element located at a spool so as to ensure that the pressure medium can only flow in radial direction against a seal 627 located in the housing 617. The second sealing means may be of different design. It is possible to provide a spool seat surface located at the spool and moveable against the force of a spring; said spool seat surface is adapted to cooperate with a fixedly located seat surface provided at the housing, or, it is also possible to provide a plurality of control bores 680 in the housing in the area of a port, said control bores 680 having a relatively small diameter "d"; a seal 670 located in the spool is used for opening and closing said bores 680, without there being a possibility that the seal 670 can be damaged. It is also possible to make use of the last mentioned sealing principle by itself.

Preferably, the sealing means will be employed using a pressure guide element and a housing seal between the user port A and the tank port T. The second sealing means are preferrably located between the pump P and the port A, regardless whether the second sealing means are in the form of the spool seat surface/housing seat surface-seal or seal means using control bores 680 and a seal 670 in the spool.

Figure 26:
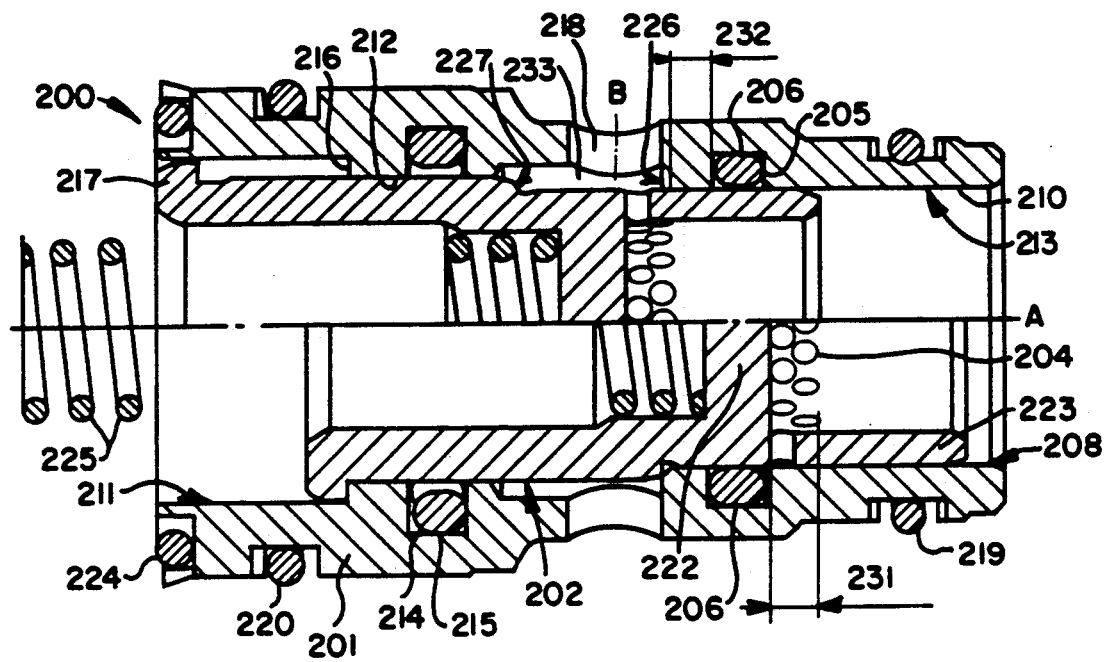
FIG. 26 is a longitudinal section of a logic valve of a first design and in accordance with a third aspect of the invention.
Figure 27:
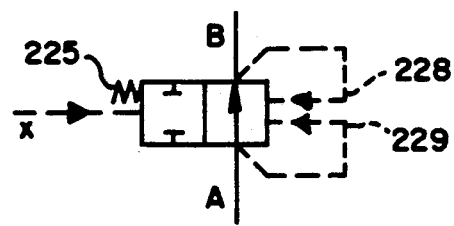
FIG. 27 is the symbol of the logic valve of FIG. 26.

In connection with FIGS. 26 through 31 a so-called logic valve will be described, i.e. a 2/2 control valve. FIGS. 26 and 27 disclose a first, FIGS. 28 and 29 a second and FIGS. 30 and 31 a third embodiment. The logic valve represented by said three embodiments is specifically useful for HWF liquids and can therefore be called a water-hydraulic valve. Known 2/2 logic valves for HWF liquids are so-called poppet valves and use a valve seat made of plastic material, a valve seat which cooperates with a spool made of steel. It is also known to make the seat of steel and to use a spool made of plastic material. The present invention realizes a HWF logic valve in the form of a so-called 2/2 control valve of the sliding type. By means of the following inventive features, specifically a plastic seal and bores cooperating with said plastic seal, one achieves a soft sealing effect between the valve spool and the valve housing.

FIG. 26 is a longitudinal section through a logic valve of the invention for HWF-liquids. In the upper part of FIG. 27 the valve is in its opening position, i.e. the HWF liquid can flow from A to B. In the lower portion of FIG. 26 the valve is in its closed position, i.e. no HWF liquid can flow from A to B. FIG. 27 shows the symbol of the valve of FIG. 26.

The logic valve 200 of FIG. 26 comprises a valve sleeve 201 having a longitudinal bore 210 in which a valve spool 202 is reciprocally mounted between a valve opening position and a valve closing position. When the valve 200 is in use, the valve sleeve 201 is inserted in a known manner into a receiving space. The seals 219 and 220 and also 224 provide for the required sealing effect with respect to the receiving space.

The longitudinal bore 210 comprises a longitudinal bore section 211 having a large diameter, a longitudinal bore section 212 having a middle range cross section and a longitudinal bore section 213 having a small diameter. At the transition from the bore section 211 to the bore section 212 a shoulder 216 is formed. At the transition from the middle longitudinal bore section 212 to the smaller longitudinal bore section 213 an annular shoulder 226 is defined. Adjacent to the annular shoulder 226 an annular space 233 is defined in the area of the middle longitudinal bore section 212; said annular space 233 being connected via radially extending service ports 218 with a space which is formed by the valve sleeve 201 and the receiving space. The space formed in such a manner is then connected to user B.

The valve spool 202 comprises a section 217 having a larger diameter adapted to slide in section 211 and adapted for abutment at abutment 216. Further, following section 217 another spool section 221 having a middle diameter is provided and forms an annular surface 227 facing towards the abutment 26. Following the ring surface 227 is a spool section having a smaller diameter, a spool section which is adapted to slide in the longitudinal bore section 213 having the smaller diameter. This spool section having a cross wall 222 comprises a tube-shaped extension 223.

The valve 200 receives the flow medium from its head end, i.e. the flow medium flows in the opening position of the valve from the inside towards the outside, i.e. A to B.

The sealing between the spool 202 and the valve sleeve 201 is effected in the area of the longitudinal bore section 212 by means of a seal arranged in an annular groove of the sleeve 201; said seal comprises an O-ring 215 and a Turconring facing towards the spool 202. Further, within an annular groove 230 in the area of the longitudinal bore section 213 an O-ring 206 is arranged, an O-ring which presses a thin Turcon-annular seal 205 against the spool 202. The seal 205, 206 will be passed by the spool 202 and the opening means provided therein when switching occurs between the opening position and the closing position; according to the invention is provided that the opening means are not formed by a plurality of circumferentially distributed relatively large openings, but by a plurality of small radial bores 204 which are preferrably arranged in one annular array or a plurality of annular arrays or rings.

In FIG. 26 the width of the surface of the spool 202 in which the radial bores 204 are located is designated by the reference numeral 231. In accordance with the invention it is provided that the movement of the spool 202 into its closing position initially separates the connection between A and B prior to the radial bores 204 reaching the area of the seal 205, 206. This means, that the sleeve comprises a land width 232 between the annular space 233 and the annular groove 230, said land width 232 having a width substantially equal to the width 231 that is preferrably somewhat larger than the width 231.

The Turcon-ring 205 is for the typical flow of FIG. 26 from the inside towards the outside of thin design as mentioned, i.e. the axial extension of ring 205 is clearly larger than its radial extension. As already mentioned, the O-ring 206 causes the elastic engagement of the Turcon-ring 205. The turcon-ring is made of a plastic material, so that for HWF-liquids the desired soft sealing effect is obtained. Particularly, for applications in the area of mining, logic valves having a soft sealing characteristic are preferred. The use of a thick Turcon-ring, as is shown with reference to FIG. 28, is not useful for being arranged in the annular groove 230 of the valve sleeve 201.

The general mode of operation of the logic valve 200 shown in FIGS. 26 and 27 is known. The valve 200 is normally held in its closed position shown in the lower part of FIG. 26 by means of a control pressure x (see FIG. 27), a pressure which acts in FIG. 26 from the left-hand side towards the inner space of the spool 202. A spring 225 also applies a force onto the spool 202 towards the right, but the latter force is only of secondary importance and actually is only used for overcoming the friction. Normally, the control pressure x is either derived from port A or port B. If a connection between A and B is desired, the control pressure x is removed, so that the spool 202 can move into the position shown in the upper part of FIG. 26. Then, the pressure present at B will act on the annular surface 233 as is shown by the control connection 228 in the symbol of FIG. 27. The other control connection 229 shown in FIG. 27 discloses that the pressure existing at A also acts upon the spool 202. The switching operation back to the closing position has to be carried out by applying a control pressure x.

Figure 28:
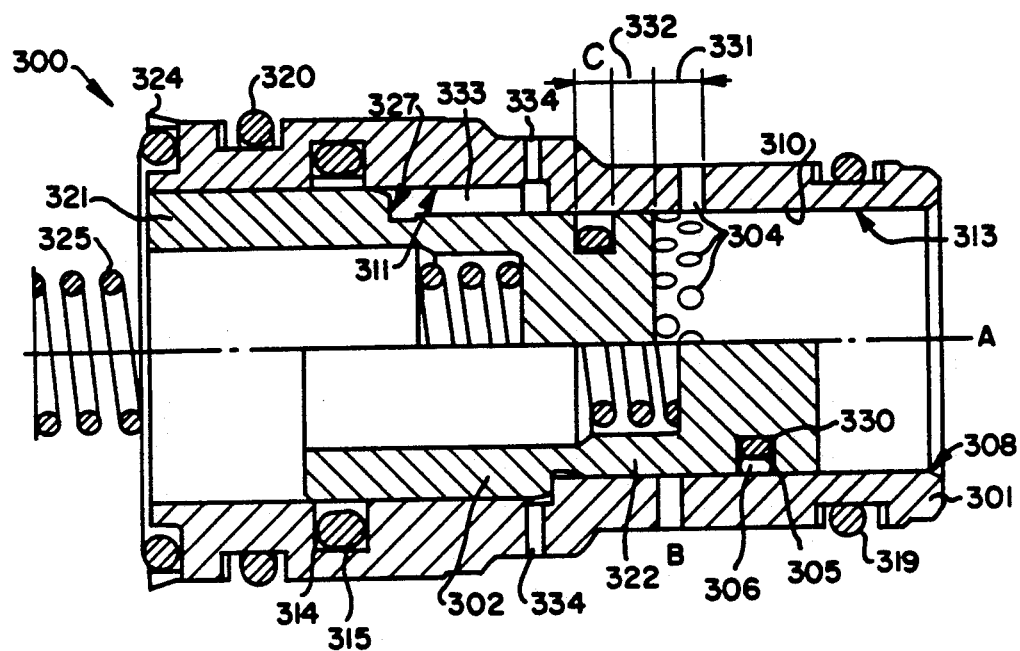
FIG. 28 is a longitudinal sectional view of another embodiment of a logic valve similar to the one shown in FIG. 26.
Figure 29:
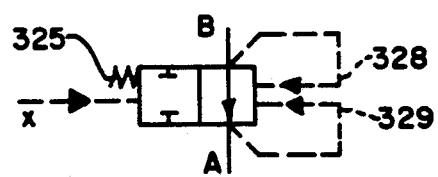
FIG. 29 shows the symbol of the logic valve of FIG. 28.

Another embodiment of a logic valve is shown in FIGS. 28 and 29. The logic valve 300 differs from the logic valve 200 by the fact that for the logic valve 300 the flow occurs from the outside towards the inside, i.e. from B to A. Wherever possible similar reference numerals as were used in FIG. 26 will be used also here. The main distinction between the two embodiments resides in the fact that here the plurality of radial bores 304 is provided in the valve sleeve 201 while the cooperating seal comprising O-ring 305 and Turcon-ring 306 is located in an annular groove 330 of the piston 302. The plastic or Turcon seal 306 is in the present embodiment significantly thicker than for the embodiment of FIG. 26; otherwise, however, the Turcon-ring 306 is also in this embodiment elastically pressed against the cooperating sealing surface of the piston 302.

The logic valve 300 comprises a valve sleeve 201 having a longitudinal bore 310 within which a valve spool 302 is reciprocably mounted. Sleeve 301 forms a longitudinal bore section 311 having a larger diameter and a longitudinal bore section 313 having a smaller diamter. Correspondingly, the spool 302 comprises a section 321 having a larger diameter and a section 322 having a smaller diameter. The transition from the spool section 321 to the spool section 322 froms an annular surface 327 which is adapted to abut in the closing position at an abutment 326 formed between the longitudinal bore section 311 and the longitudinal bore section 313. A pressure equalizing bore 334 extends between the outside of the valve sleeve 201 to an annular space 333 formed between the abutment 326 and the annular surface 327.

Similarly to the design of valve 200 this embodiment also provides for an annular groove in the valve sleeve 301 in which an O-ring 320 is located together with a turcon-ring 314 for engagement with the valve spool 202. Moreover, the valve sleeve 201 is provided at the outside with seals 319, 320 and 324, so as to provide for a sealing effect between the receiving space.

The control connection 328—see FIG. 29—is assured in this case by the pressure equalizing bore 334. The control connection 329 corresponds to the control connection 229 of the embodiment of FIG. 18.

A plurality of radial bores 304 in the valve sleeve 201 replaces for all practical purposes the radial port bores 218 of the embodiment of FIG. 26 and consequently, said radial bores are designated "310" in FIG. 28.

The width 331 of the surface penetrated by the plurality of radial bore 304 is preferably equal to or also somewhat smaller than the land width 332 of a land formed by the annular groove 330 at the spool 302. This means that during the movement from the opening position of the valve 300 to its closing position initially all radial bores 304 are passed by the land having the land width 332, prior to allowing that the pressure medium at B will come to seal 305, 306. The function of the logic valve 300 is clear to a man skilled in the art based on the above description.

Figure 30:
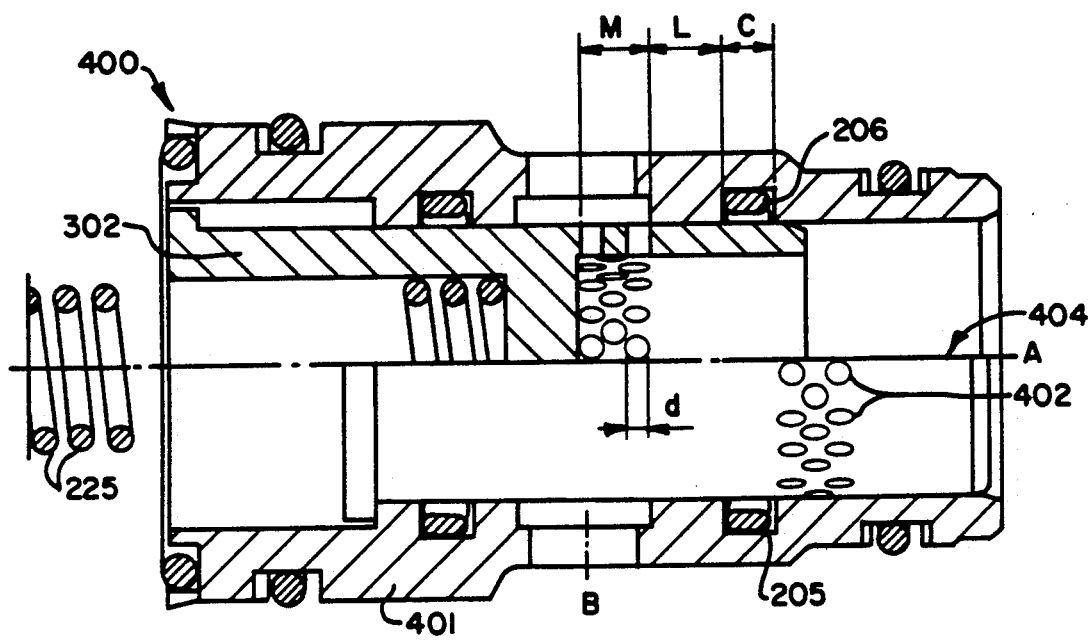
FIG. 30 shows a longitudinal sectional view of another logic valve which is essentially similar to the logic valve 26.
Figure 31:
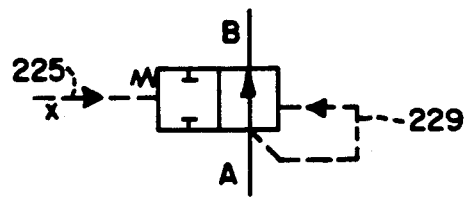
FIG. 31 is the symbol of the logic valve of FIG. 30.

The embodiment of FIGS. 30 and 31 relates to a logic valve 400 which is substantially similar to the logic valve 200 of FIGS. 26 and 27, so that only the differences have to be pointed out. The logic valve 400 does not comprise a surface corresponding to the annular surface 227 of FIG. 26, so that in accordance therewith FIG. 31 does not show a connection corresponding to the control connection 228. Further, the present embodiment shows three rings of radial bores 404 in the valve spool 402, said bores 404 being offset with respect to each other. FIG. 30 shows in a particularly clear manner the O-ring 206 and the flat and wide design of the turcon-ring 205. Moreover, some of the customary reference numerals of FIGS. 26 and 27 are inserted into the FIGS. 30 and 31. The valve sleeve or bushing is here designated by 401. For this valve design which is simplified with respect to the embodiment of FIG. 26 has only one hydraulic effective diameter present, a fact which leads to an absolute pressure equilibrium of the spool 402 with respect to the load pressure $p_B$ at port B. The valve 400 will close for $p_X = p_A$ only for the force of spring 225, whereby—in contrast to a logic poppet valve— the degree of sealing does not depend on the closing force, i. e. for the smallest pressures absolute tightness will be achieved.

The representation of FIG. 30 will now be used to make some general remarks with respect to the width of the area of bores M, the land width L and the sealing width C. For the embodiment of FIG. 26 the width of the area of bores M is also referred to by reference numeral 231, the land width L is referred to by reference numeral 332 and the sealing width C is not shown, but is present in a similar manner as is shown in FIG. 30. In the embodiment of FIG. 28 the width of the area of bores M is referred to by the reference numeral 331, the land width L is referred to by reference numeral 332 and the sealing width C is shown in said Figure.

In all embodiments the diameter of a radial bore 204, 304 and 404 may be designated by "d" as is shown only in FIG. 30 (and also in FIG. 10).

It should be noted initially that the diameter d of the bores should be as small as possible. The smaller the diameter of the bores, the better. It is, however, necessary to strike a compromise with respect to cost. If d is smaller or equal C/2 favorable conditions occur. In the area of the bores, the remaining supporting portion of the material defining the effective width should be approximately 70%, so that the bores comprise approximately 30%.

Preferably, the land width L should be larger than the sealing width C. The number of rings within which the radial bores are arranged, may be generally selected quite freely. It is, however, not necessary that the rings are evenly equipped with the maximum possible number of radial bores. So as to achieve a "soft" switching operation it is, in fact, possible to provide the rings with a changing number of bores. The "dampening rod" used for logic poppet valves becomse, as a consequence, superfluous.

Generally, the land width L should be larger than $n \cdot d$, with $n = 1, 2, 3 \ldots$ "n" is the number of axially offset bore rings. For instance, in FIG. 21 n=3, while in FIGS. 26 and 28 n=2.

The expression "turcon" is a trademark for a seal containing polytetrafluorethylen (PTFE) as a base material. In the valve housing a turcon-double-delta-seal and in the spool a turcon-glyd-ring is used.

What we claim is:

1. A direction spool valve comprising:
   a main housing member,
   a bushing sealingly mounted in said main housing member,
   a center bore in said bushing,
   a control spool reciprocally mounted in said center bore and adapted to guide pressurized fluid to one of at least one user and to a tank,
   a pressure guide element on said control spool,
   a bushing seal located in a bushing groove of said bushing for cooperation with said pressure guide element so as to provide a sealing effect for the same, wherein the pressure guide element is an integral part of the control spool and is arranged above a recess in the control spool,
   radial bores in the pressure guide element for guiding fluid in a substantially radial direction onto said bushing seal,
   wherein an axial width of an area of the radial bores is smaller an axial length L' of an annular land formed between the bushing groove receiving the bushing seal in the bushing and an adjacent annular recess in the bushing,
   control bores arranged in the bushing for cooperation with a spool seal in the control spool element being arranged adjacent to a land having a width L which is larger than an axial width of the control bores.

2. The directional valve of claim 1, wherein a plurality of seals is provided in the housing for cooperation with appropriate pressure control elements.

3. The direction valve according to claim 1, wherein the pressure guide element is provided in the form of a sleeve.

4. The directional valve according to claim 3, wherein the sleeve is fixedly mounted to a rod portion of the control spool.

5. The directional valve according to claim 4, wherein only part of the recess in the control spool is covered by the sleeve by means of an inner end and an area which comprises radial openings in the form of radial bores.

6. The directional valve according to claim 5, wherein the pressure guide element comprises besides the set of radial bores another set of radial bores which are outwardly offset in such a manner that for an extended recess in the rod portion the neutral position of the spool provides for a connection between the user and the tank.

7. The directional valve according to claim 3, wherein the sleeve guides pressure medium via the radial bores from the inside to the outside in a substantially radially direction onto the seal.

8. The directional valve according to claim 1, wherein for a 4/3-control valve two pressure guide elements are provided in mirror like fashion so as to control the connection between a user (A) and a user (B), respectively.

9. The direction valve according to claim 1, wherein the control bores are located in an annular channel provided in said bushing.

10. The directional valve according to claim 9, wherein a plurality of control bores is circumferentially arranged.

11. The directional valve according to claim 10, wherein two rows of control bores are provided, said rows being offset with respect to each other.

12. The directional valve according to claim 1, wherein all control bores have the same diameter.

13. The direction valve according to claim 1, wherein the pressure guide element covers the housing seal in each switching position.

* * * * *